(12) United States Patent
Park et al.

(10) Patent No.: US 9,862,369 B2
(45) Date of Patent: Jan. 9, 2018

(54) MODE CONTROL APPARATUS OF HYBRID VEHICLE AND CONTROL METHOD THEREOF

(71) Applicants: Hyundai Motor Company, Seoul (KR); Kia Motors Corporation, Seoul (KR)

(72) Inventors: Joonyoung Park, Seoul (KR); Tae Woo Kim, Gyeonggi-Do (KR); Song-Il Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 113 days.

(21) Appl. No.: 14/562,736

(22) Filed: Dec. 7, 2014

(65) Prior Publication Data
US 2015/0232080 A1    Aug. 20, 2015

(30) Foreign Application Priority Data

Feb. 17, 2014    (KR) .................. 10-2014-0017692

(51) Int. Cl.
*B60W 20/00*    (2016.01)
*B60W 10/06*    (2006.01)
(Continued)

(52) U.S. Cl.
CPC .............. *B60W 10/02* (2013.01); *B60K 6/48* (2013.01); *B60W 10/06* (2013.01); *B60W 10/08* (2013.01); *B60W 10/113* (2013.01); *B60W 20/10* (2013.01); *B60W 20/40* (2013.01); *B60K 2006/4825* (2013.01); *B60W 2510/0241* (2013.01); *B60W 2510/0638* (2013.01); *B60W 2510/1015* (2013.01); *Y02T 10/6221* (2013.01);
(Continued)

(58) Field of Classification Search
None
See application file for complete search history.

(56) References Cited

U.S. PATENT DOCUMENTS 8,608,616 B2 * 12/2013 Nissato ................. B60W 20/10
180/65.21
2011/0178695 A1 * 7/2011 Okumoto ............ F02N 11/0844
701/103

(Continued)

FOREIGN PATENT DOCUMENTS

JP    2010-155590 A    7/2010
JP    2010-195348 A    9/2010
(Continued)

*Primary Examiner* — Rami Khatib
*Assistant Examiner* — Nicholas K Wiltey
(74) *Attorney, Agent, or Firm* — Mintz Levin Cohn Ferris Glovsky and Popeo, P.C.; Peter F. Corless (57) ABSTRACT

A mode control apparatus of a hybrid vehicle is provided. The apparatus includes a first clutch that is disposed between an engine and a motor generating power and a second clutch that is disposed between the motor and a transmission. In addition, a controller is configured to execute engagement and disengagement of the first clutch and the second clutch. The controller is also configured to adjust the speed of the motor and the transmission to be synchronized by generating slip in the second clutch when a transition from an EV mode to an HEV mode is requested.

9 Claims, 8 Drawing Sheets

(51) Int. Cl.
*B60W 10/02* (2006.01)
*B60W 10/08* (2006.01)
*B60W 20/10* (2016.01)
*B60K 6/48* (2007.10)
*B60W 10/113* (2012.01)
*B60W 20/40* (2016.01)

(52) U.S. Cl.
CPC ........ *Y02T 10/6252* (2013.01); *Y02T 10/6286* (2013.01); *Y10S 903/902* (2013.01)

(56) References Cited

U.S. PATENT DOCUMENTS

| | | | | |
|---|---|---|---|---|
| 2013/0150206 | A1* | 6/2013 | Nissato | B60W 20/10 477/5 |
| 2013/0297105 | A1* | 11/2013 | Yamazaki | B60K 6/48 701/22 |
| 2014/0163790 | A1* | 6/2014 | Kim | B60W 20/40 701/22 |
| 2014/0349810 | A1* | 11/2014 | Kaltenbach | B60K 6/48 477/5 |
| 2015/0166056 | A1* | 6/2015 | Cho | B60W 10/08 701/22 |
| 2015/0232080 | A1* | 8/2015 | Park | B60K 6/48 701/22 |
| 2015/0314778 | A1* | 11/2015 | Matsui | F02D 29/02 701/22 |
| 2015/0344025 | A1* | 12/2015 | Park | B60K 6/48 701/22 |
| 2016/0272192 | A1* | 9/2016 | Ashizawa | B60W 20/19 |

FOREIGN PATENT DOCUMENTS

| | | |
|---|---|---|
| KR | 10-0837461 B1 | 6/2008 |
| KR | 10-2011-0062133 A | 6/2011 |

* cited by examiner

RELATED ART

MODE CONTROL APPARATUS OF HYBRID VEHICLE AND CONTROL METHOD THEREOF

CROSS-REFERENCE TO RELATED APPLICATION

This application claims priority to and the benefit of Korean Patent Application No. 10-2014-0017692 filed in the Korean Intellectual Property Office on Feb. 17, 2014, the entire contents of which are incorporated herein by reference.

BACKGROUND (a) Field of the Invention

The present invention relates to a mode control apparatus of a hybrid vehicle. More particularly, when a driving mode is converted from an electric vehicle (EV) mode to a hybrid electric vehicle (HEV) mode, the driving mode is converted using slip of a dual clutch. An engine clutch can be designed as a dry clutch to reduce production cost.

(b) Description of the Related Art

Figure 1:
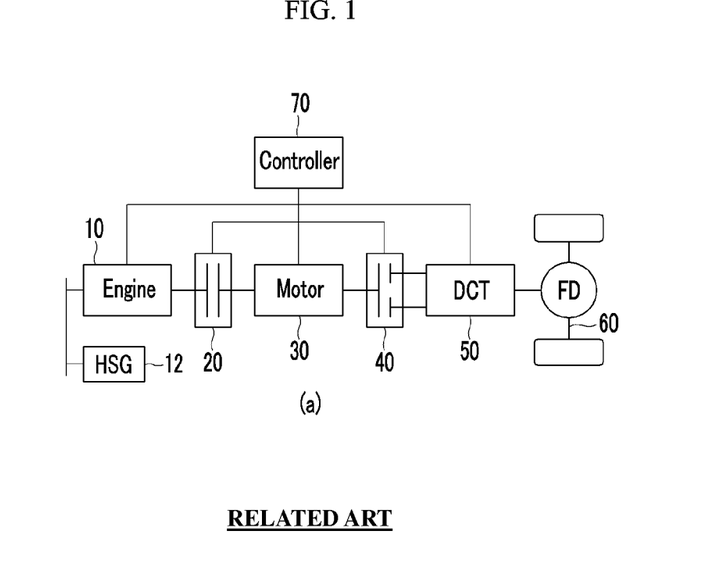
FIG. 1 is an exemplary schematic diagram illustrating a general hybrid vehicle according to the related art.

A hybrid vehicle is a vehicle that uses at least two power sources. Generally, the hybrid vehicle is operated by an engine and a motor. The hybrid electric vehicle can be manufactured in various types using the engine and the motor. FIG. 1 is an exemplary schematic diagram illustrating a parallel hybrid vehicle according to the related art. As shown in FIG. 1, in the parallel hybrid vehicle, an engine 10 and a motor 30 are connected by an engine 10 clutch, a dual clutch 40 is connected to shafts of the engine 10 and the motor 30, and a transmission 50 is connected to the dual clutch 40. A hybrid start generator (HSG) 12 is provided in the engine 10.

Driving modes of the hybrid vehicle may be an EV mode which is a mode of a true electric vehicle using power of the driving motor 30, an HEV mode using torque of the driving motor 30 as auxiliary power while using torque of the engine 10 as main power, and a regenerative braking (RB) mode collecting brake and inertia energy through generation of the driving motor 30 to charge the battery during braking or driving using inertia of the vehicle.

A transition between the EV mode and the HEV mode is one of key features of the hybrid vehicle, and affects driving performance, fuel consumption, and power performance of the hybrid vehicle. Generally, in initial starting, the hybrid vehicle operates the motor 30 using power charged in the battery, wherein the dual clutch 40 is locked up by a driving torque generated at the motor 30, and the driving torque is transmitted to a drive shaft 60.

However, it is necessary to convert a driving mode to the HEV mode when the hybrid vehicle is driven in the EV mode in a low speed region. The low speed region may be one in which the motor speed and engine speed cannot be synchronized since the motor speed is less than a minimum engine speed. For example, the driving mode needs to be converted from the EV mode to the HEV mode when the vehicle travels on a steep uphill road (e.g., travels on an incline) while the vehicle is driving on a planar road (e.g., a substantially even road with minimal inclines or declines) in the EV mode, when the vehicle drives on a long uphill road, or when the vehicle starts in EV mode but power of the engine is necessary before the motor speed reaches a synchronizing speed of the engine.

However, according to the related art, excessive heat is generated in an engine clutch 20, since power of the engine 10 is transferred through slip of the engine clutch 20. Therefore, the engine clutch 20 should be designed as a dry clutch rather than a wet clutch. Accordingly, when the engine clutch 20 is designed as a wet clutch, manufacturing cost is increased and fuel consumption is deteriorated. Further, since the mode change is performed through slip of the engine clutch 20, slip capacity of the engine clutch 20 should be increased. Since a friction area of the engine clutch 20 is increased, degree of design freedom may be deteriorated.

The above information disclosed in this section is merely for enhancement of understanding of the background of the invention and therefore it may contain information that does not form the prior art that is already known in this country to a person of ordinary skill in the art.

SUMMARY

The present invention provides a mode control apparatus and a control method in which a driving mode may be changed through slip of a dual clutch.

A mode control apparatus of a hybrid vehicle according to an exemplary embodiment of the present invention may include: a first clutch disposed between an engine and a motor configured to generate power; a second clutch disposed between the motor and a transmission; and a controller configured to execute engagement and disengagement of the first clutch and the second clutch, wherein the controller is also configured to adjust the speed of the motor and the engine to be synchronized by generating slip in the second clutch when a transition from an EV mode to an HEV mode is requested, wherein the EV mode is a mode that disengages the first clutch and engages the second clutch, and drives the vehicle using the motor driving torque, and the HEV mode is a mode that engages the first clutch and the second clutch, and drives the vehicle using the motor driving torque and the engine driving torque.

The controller may be configured to operate the engine to be started, operate the second clutch to slip by reducing coupling force of the second clutch, operate the first clutch to be engaged after synchronizing an engine speed and a motor speed, and operate the second clutch to be fully engaged when the input speed of the transmission is greater than a minimum engine speed, when the transition from the EV mode to the HEV mode is requested and when an input speed of the transmission is less than a minimum speed of the engine.

The controller may further be configured to operate the second clutch to be released, operate the first clutch to be engaged by starting the engine, operate the second clutch to slip by increasing coupling force of the second clutch, and operate the second clutch to be fully engaged when input speed of the transmission is greater than a minimum engine speed, when the transition from the EV mode to the HEV mode is requested in a state where the motor cannot be used. The controller may be configured to start the engine while maintaining engagement of the second clutch, and operate the first clutch to be engaged after synchronizing the engine speed and the motor speed, when the transition from the EV mode to the HEV mode is requested and when an input speed of the transmission is greater than a minimum speed of the engine.

A mode control method of a hybrid vehicle according to an exemplary embodiment of the present invention may include: determining whether a transition from an EV mode to an HEV mode is requested; determining whether an input speed of a transmission is zero; determining whether the input speed of the transmission is greater than a minimum engine speed, when the input speed of the transmission is greater than zero; generating slip of a second clutch disposed between a motor and a transmission by reducing a coupling force of the second clutch and maintaining an engine in an idle state after starting the engine, when an input speed of the transmission is less than the minimum engine speed; determining whether the engine speed is synchronized with the motor speed; engaging an first clutch disposed between the engine and the motor when the engine speed and the motor speed are synchronized; and fully engaging the second clutch when the input speed of the transmission is greater than the minimum engine speed.

The mode control method of a hybrid vehicle may further include: operating the second clutch to be released by reducing coupling force of the second clutch, operating the first clutch to be engaged, starting the engine using the motor or an additional starting motor, and operating the second clutch to cause slip by increasing coupling force of the second clutch, when the input speed of the transmission is zero; determining whether the input speed of the transmission is greater than the minimum engine speed; and fully engaging the second clutch when the input speed of the transmission is greater than the minimum engine speed.

The mode control method of a hybrid vehicle may further include: synchronizing the engine speed with the motor speed after starting the engine while maintaining engagement of the second clutch; and engaging the first clutch after synchronizing the engine speed and the motor speed when the input speed of the transmission is greater than zero and the input speed of the transmission is greater than the minimum engine speed.

According to an exemplary embodiment of the present invention, when a driving mode of a hybrid vehicle is converted from an EV mode to an HEV mode, the driving mode may be converted through slip of a dual clutch. Further, since the driving mode is converted using the slip of the dual clutch, the engine clutch may be designed as a dry clutch, to thus reduce manufacturing cost of the vehicle, and fuel consumption may be reduced. Further, since the engine clutch may be designed as a dry clutch, a degree of design freedom may be improved.

BRIEF DESCRIPTION OF THE DRAWINGS

These drawings aim to facilitate understanding of exemplary embodiments of the present invention, and the technical idea of the present invention should not be construed as limited to the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention.

The drawings and description are to be regarded as illustrative in nature and not restrictive, and like reference numerals designate like elements throughout the specification. Further, the size and thickness of each configuration shown in the drawings are arbitrarily shown for understanding and ease of description, but the present invention is not limited thereto.

Figure 2A:
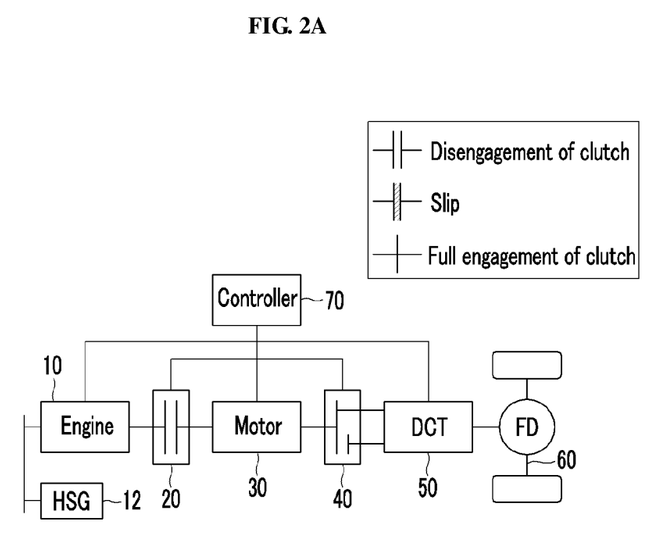
FIGS. 2A-2B are exemplary schematic diagrams illustrating a mode converting process in a normal state according to an exemplary embodiment of the present invention.
Figure 2B:
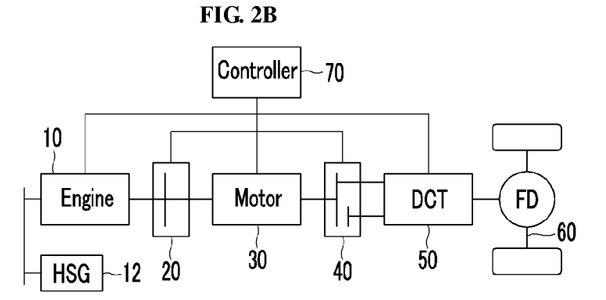
Figure 3:
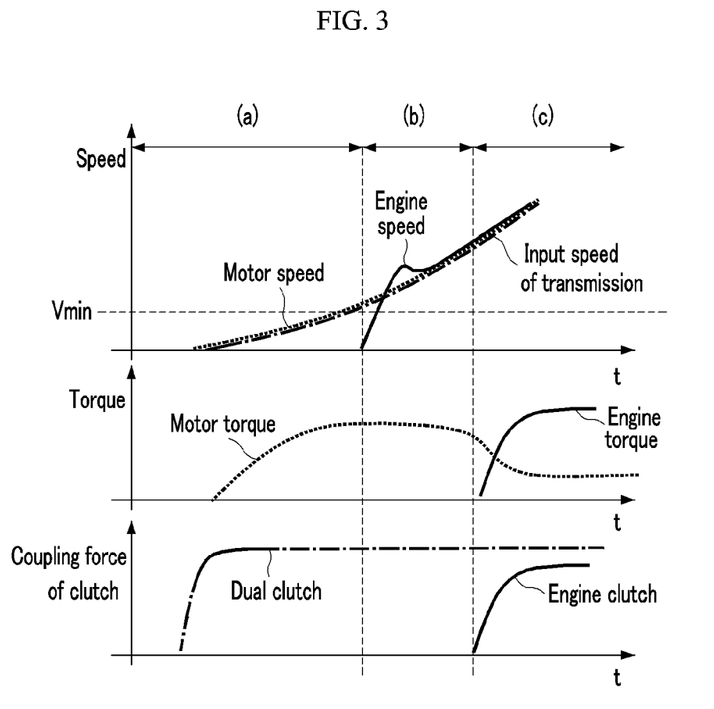
FIG. 3 is an exemplary graph illustrating speed, torque, and coupling force of clutches according to time while a driving mode of a hybrid vehicle is converted in a normal state according to an exemplary embodiment of the present invention.

FIGS. 2A-2B are exemplary schematic diagrams illustrating a mode converting process in a normal state according to an exemplary embodiment of the present invention. FIG. 3 is an exemplary graph illustrating speed, torque, and coupling force of a clutch according to time while a driving mode of a hybrid vehicle is converted in a normal state according to an exemplary embodiment of the present invention. As shown in FIG. 2, a hybrid vehicle according to an exemplary embodiment of the present invention may include an engine clutch 20 disposed between an engine 10 and a motor 30 generating power, a dual clutch 40 (DCT: dual clutch transmission) disposed between the motor 30 and a transmission 50, and a controller 70 configured to execute engagement and disengagement of the engine clutch 20 and the dual clutch 40. The controller 70 may be realized by one or more processors activated by a predetermined program, and the predetermined program may be programmed to perform each step of a mode control method of a hybrid vehicle according to an exemplary embodiment of this invention.

The dual clutch 40 may be configured to selectively transmit power input from the motor 30 to input shafts of the transmission 50 using two clutches, and transmit power to a drive shaft 60 by adjusting a speed ratio of the two input shafts. A hybrid start generator 12 (HSG) may be disposed within the engine 10 to ignite fuel of a cylinder disposed within the engine 10. The motor 30 may support power of the engine 10 while the vehicle is driving, and the motor 30 may be operated as a generator while the vehicle is in a regenerative braking condition to charge a battery. The HSG may be called a starting motor.

Referring to FIGS. 2A-2B, a mode control apparatus of a hybrid vehicle according to an exemplary embodiment of the present invention will be described in detail. As shown in FIG. 2A, the vehicle starts using the motor torque while maintaining engagement of the dual clutch 40. In other words, the hybrid vehicle may start in an EV mode (electric vehicle mode). In particular, the EV mode is a mode that disengages the first clutch and engages the second clutch, and drives the vehicle using the motor driving torque.

When the driving mode is converted to an HEV mode (hybrid electric vehicle), as shown in FIG. 2B, the controller 70 may be configured to synchronize engine speed and motor speed over the minimum engine speed after starting the engine 10. When the engine speed and the motor speed are synchronized, the controller 70 may be configured to operate the engine clutch 20 to be fully engaged, and power of the engine 10 may be transmitted to the drive shaft 60 of the vehicle. In other words, the hybrid vehicle may travel in the HEV mode. Particularly, the HEV mode is a mode that engages the first clutch and the second clutch, and drives the vehicle using the motor driving torque and the engine driving torque.

As shown in FIG. 3, in an (a) period in which the hybrid vehicle travels in the EV mode, the motor speed may be gradually increased and the motor torque may also be gradually increased. An engaging force of the dual clutch 40 may be maximized in the EV mode. In a (b) period in which the motor speed and the engine speed are synchronized, the engine speed may be rapidly increased by starting the engine 10 and the engine speed may be synchronized with the motor speed over the minimum engine speed. Since the engine clutch 20 may not be engaged in the (b) period, the motor torque may be maintained substantially constant but the engine torque may not be transmitted to the drive shaft 60.

In the HEV mode period of the hybrid vehicle (referring to a (c) period of FIG. 3), the motor speed may be synchronized with the engine speed, and the motor speed and the engine speed may be increased. Since the engine clutch 20 may be engaged, the engine torque transmitted to the drive shaft 60 may be rapidly increased and the coupling force of the engine clutch 20 may be rapidly increased. Particularly, the mode converting method will be described when the motor torque cannot be used by depletion of the state of charge (SOC) of the battery, by limitation of the battery output, or by overheating of the motor 30.

Figure 4A:
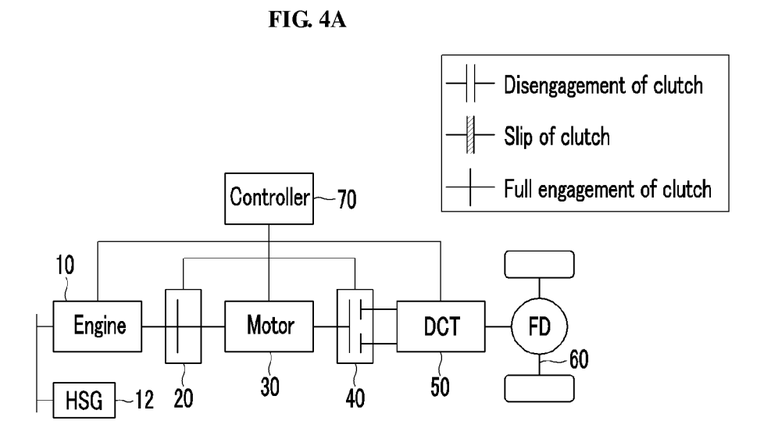
FIGS. 4A-4C are exemplary schematic diagrams illustrating a mode converting process when a motor is unavailable according to an exemplary embodiment of the present invention.
Figure 4B:
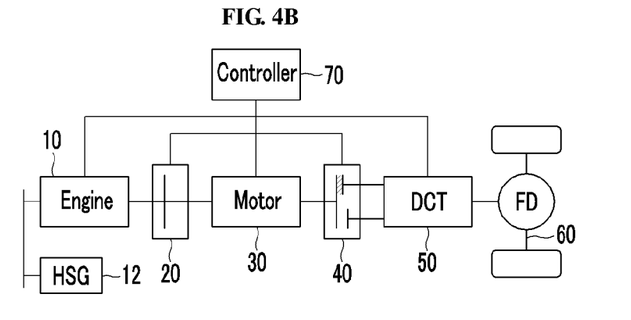
Figure 4C:
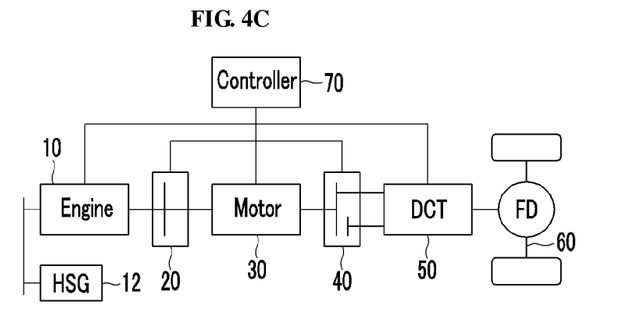
Figure 5:
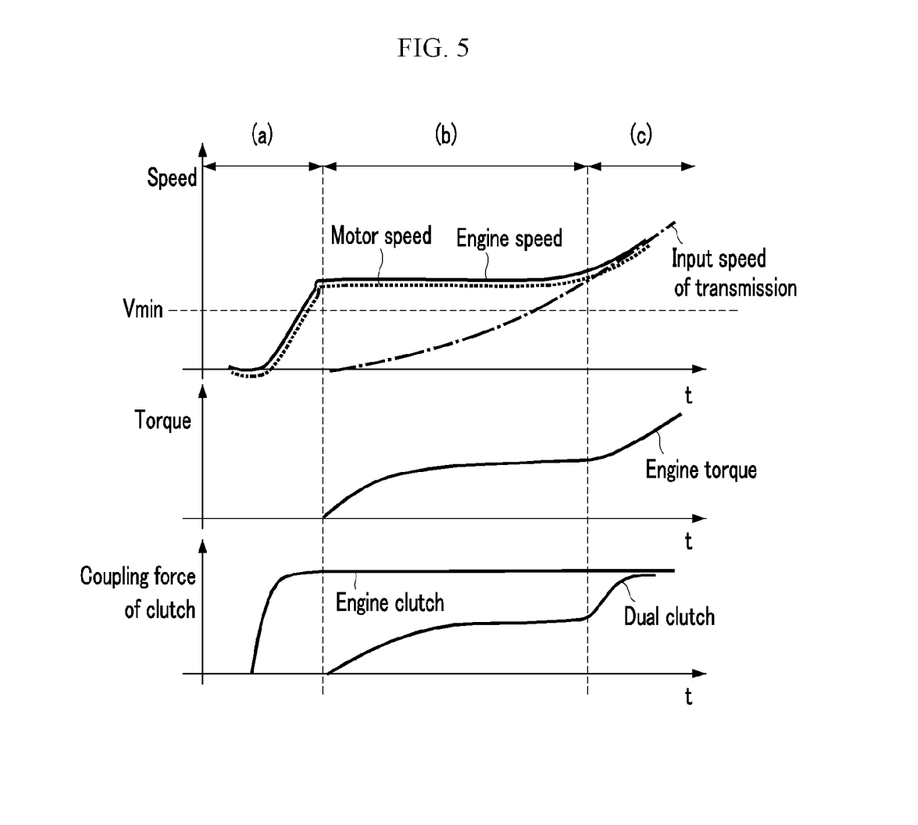
FIG. 5 is an exemplary graph illustrating speed, torque, and coupling force of clutches according to when a vehicle starts and a motor is unavailable according to an exemplary embodiment of the present invention.
Figure 6A:
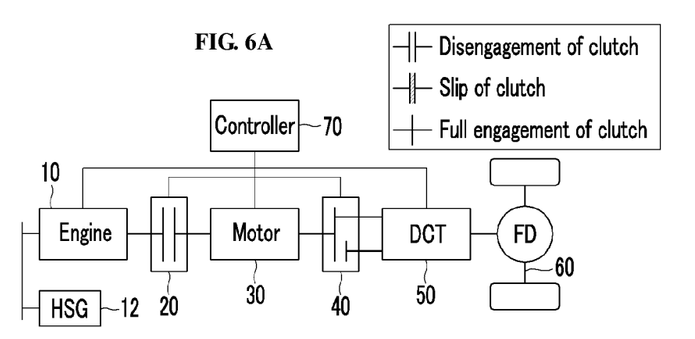
FIGS. 6A-6D are exemplary schematic diagrams illustrating a mode converting process when a hybrid vehicle is driven at a substantially low speed according to an exemplary embodiment of the present invention.
Figure 6B:
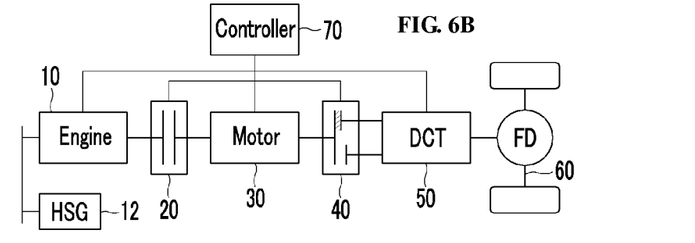
Figure 6C:
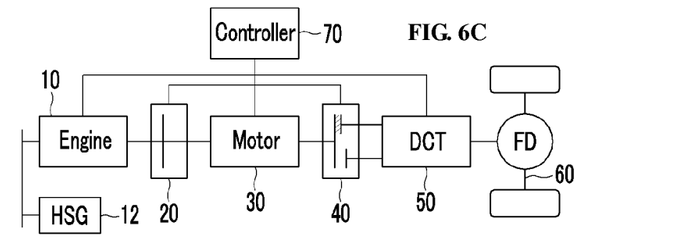
Figure 6D:
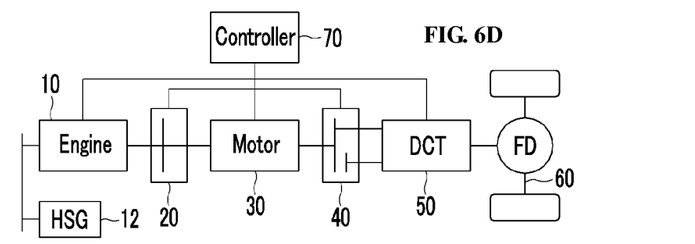

FIGS. 4A-4C are schematic diagrams illustrating a mode converting process when a motor is unavailable according to an exemplary embodiment of the present invention. FIG. 5 is an exemplary graph illustrating speed, torque, and coupling force of clutches according to time when a vehicle starts and a motor is unavailable. As shown in FIG. 4A, the engine 10 starts through the motor 30 or the HSG 12 when the engine clutch 20 is engaged. As shown in FIG. 4B, the engine torque may be transmitted to the drive shaft 60 through slip of the dual clutch 40. Since the engine speed is less than the minimum engine speed when the engine starts, sufficient engine torque may not be generated. Therefore, the engine torque may be transmitted to the drive shaft 60 through slip of the dual clutch 40. As shown in FIG. 4C, when the input speed of the transmission 50 is increased at the minimum engine speed or greater, sufficient engine torque may be generated. Accordingly, the dual clutch 40 maybe fully engaged, and the engine torque may be transmitted to the drive shaft 60.

As shown in FIG. 5, since the engine clutch 20 is engaged in an engine starting period (a) of the hybrid vehicle, the engine speed and the motor speed may be increased simultaneously. In a slip period (b) of the dual clutch 40, the input speed of the transmission 50 may be gradually increased by slip generated in the dual clutch 40. Additionally, the engine torque and the coupling force of the dual clutch 40 may be gradually increased and maintained substantially constant.

In an HEV period (c), since the dual clutch 40 is fully engaged, the input speed of the transmission 50, engine torque, and the coupling force of the dual clutch 40 may be increased. In particular, a mode converting process in a low speed region in which the engine speed cannot be synchronized with the motor speed since the motor speed is less than the minimum engine speed at the EV mode will be described. As an example, the mode change method will be applied to when the vehicle travels on a steep uphill road while the vehicle is driving on a planar road in the EV mode, when the vehicle drives on a long uphill road, or when the vehicle starts in the EV mode but power of the engine is necessary before the motor speed reaches the synchronizing speed of the engine.

Figure 7:
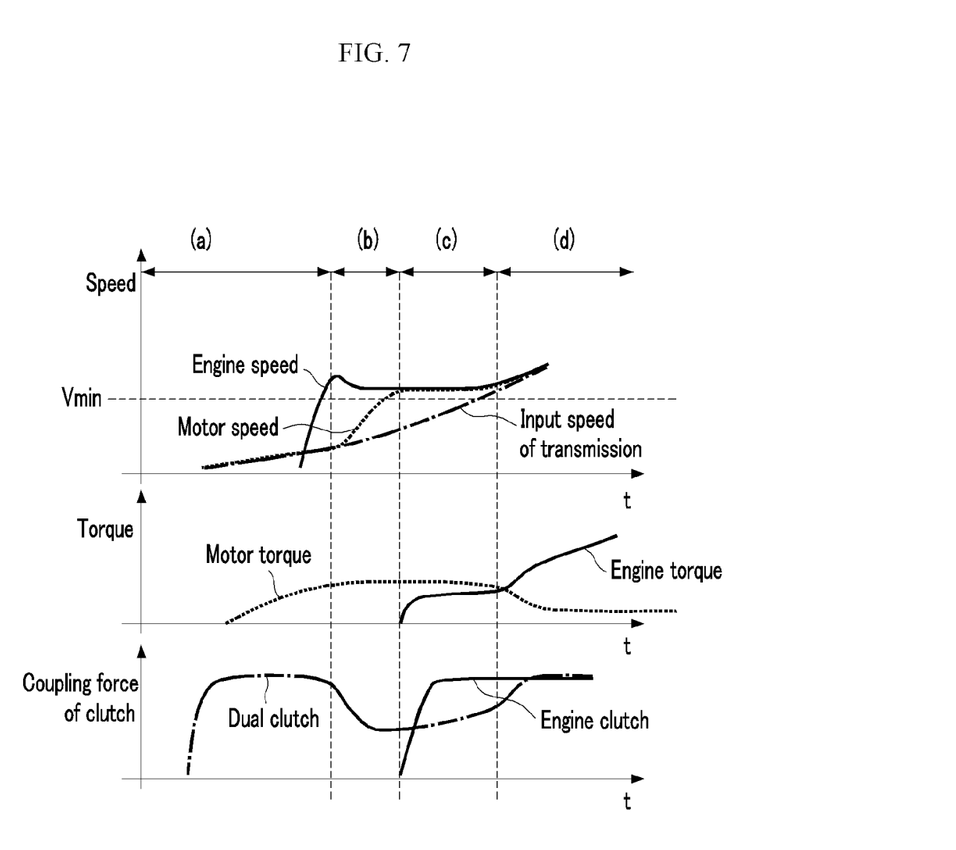
FIG. 7 is an exemplary graph illustrating speed, torque, and coupling force of clutches according to time when a vehicle travels at a substantially low speed and a driving mode is converted.

FIGS. 6A-6D are schematic diagrams illustrating a mode converting process when a hybrid vehicle is driven at a substantially low speed according to an exemplary embodiment of the present invention. FIG. 7 is a graph illustrating speed, torque, and coupling force of clutches according to time when a vehicle travels at a low speed and a driving mode is converted. As shown in FIG. 6 (a), when the hybrid vehicle travels in the EV mode in which the dual clutch 40 is engaged and the engine power is necessary, the engine 10 starts by the HSG 12. The engine 10 then maintains an idle state. As shown in FIG. 6 (*b*), slip is generated in the dual clutch 40 by reducing the coupling force of the dual clutch 40. As shown in FIG. 6 (*c*), the engine clutch 20 is engaged in order to synchronize the engine speed and the motor speed. At this time, the coupling force of the dual clutch 40 is increased as the engine torque is increased. As shown in FIG. 6 (*d*), when the engine speed and the motor speed are synchronized, the dual clutch 40 is fully engaged.

As shown in FIG. 7, in an (a) period in which the hybrid vehicle travels in the EV mode, the motor speed and the motor torque may be slightly increased. The engine torque may be rapidly increased by starting of the engine, and the coupling force of the dual clutch may be maintained substantially constant. In the slip period (b) of the dual clutch 40, the engine speed may be maintained substantially constant, and the motor speed may be increased by slip of the dual clutch 40. Since the engine clutch 20 may not be engaged, the engine torque may not be transmitted to the drive shaft 60 and the coupling force of the dual clutch 40 may be reduced by slip. In a (c) period in which the dual clutch 40 slips and the engine clutch 20 is engaged, the input speed of the transmission 50 may be gradually increased as the engine speed and the motor speed may be synchronized. The motor torque and the engine torque may then be maintained substantially constant, and the coupling force of the engine clutch 20 may be increased. In a (d) period in which the dual clutch 40 is fully engaged, the input speed of the transmission 50 may be increased as the engine speed and the motor speed are synchronized. The engine torque may also be increased with the coupling force of the dual clutch 40 by full engagement of the dual clutch 40.

Figure 8:
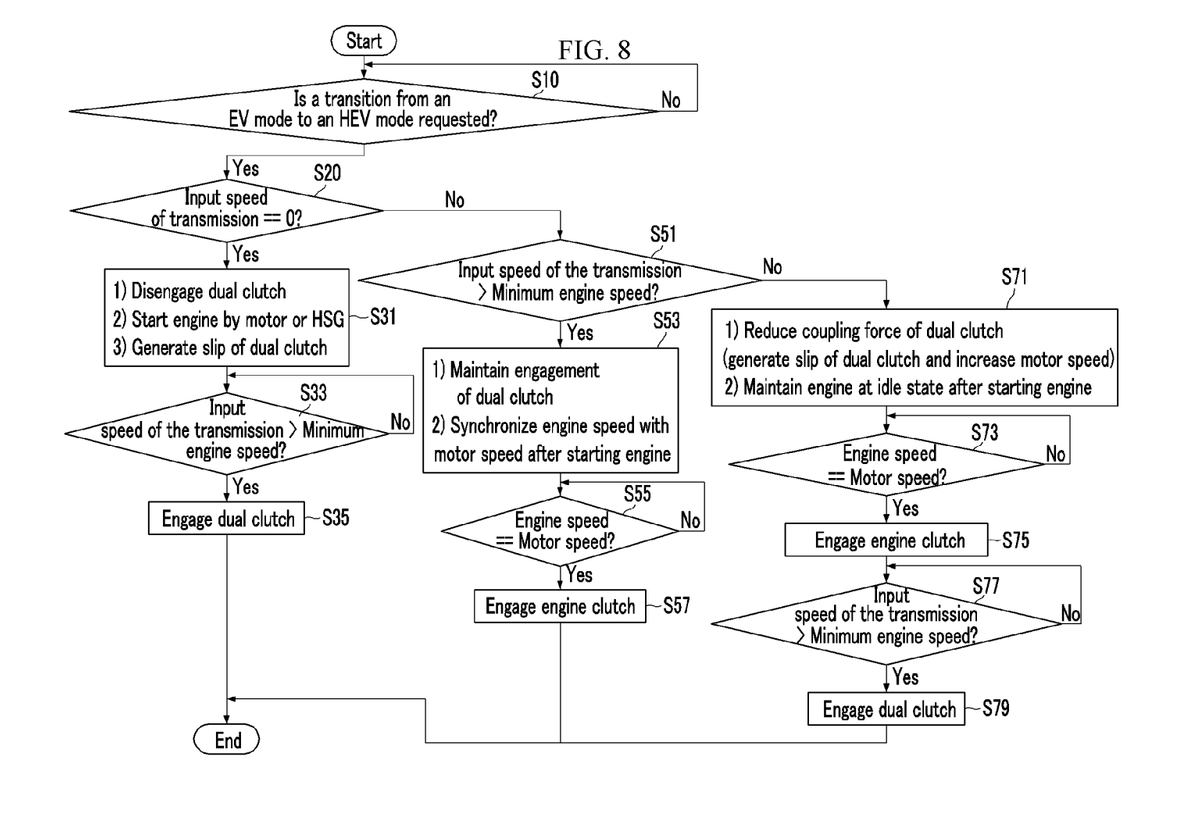
FIG. 8 is an exemplary flowchart illustrating a starting control method of a hybrid vehicle according to an exemplary embodiment of the present invention.

Hereinafter, a starting control method of a hybrid vehicle according to an exemplary embodiment of the present invention will be described in detail with reference to FIG. 8. FIG. 8 is an exemplary flowchart illustrating a starting control method of a hybrid vehicle according to an exemplary embodiment of the present invention. As shown in FIG. 8, the controller may be configured to determine whether a transition from an EV mode to an HEV mode is requested at step S10.

When the controller detects that the transition from the EV mode to the HEV mode is requested at step S10, the controller may be configured to determine whether an input speed of the transmission 50 is zero at step S20. In particular, the input speed of the transmission 50 being zero means that the motor is unavailable, as described above. When the input speed of the transmission 50 is zero in step S20, the controller may be configured to operate the dual clutch 40 to be released by reducing coupling force of the dual clutch. The controller may be configured to reduce the engine to be started using the motor 30 or the HSG 12. In addition, the controller may be configured to operate the dual clutch to slip by increasing coupling force of the dual clutch at step S31.

The controller may be configured to determine whether the input speed of the transmission 50 is greater than the minimum at step S33. When the input speed of the transmission 50 is greater than the minimum, the engine torque may be transmitted to the drive shaft by engaging the dual clutch 40 at step S35. When the input speed of the transmission 50 is greater than zero in step S20, the controller may be configured to determine whether the input speed of the transmission 50 is greater than the minimum engine speed at step S51.

When the input speed of the transmission 50 is greater than the minimum engine speed (e.g., a transition from the EV mode to the HEV mode in the normal state), the controller 70 may be configured to start the engine 10 while the dual clutch 40 is engaged. The controller 70 may then be configured to synchronize the engine speed with the motor speed at step S53. The controller 70 may be configured to detect the engine speed and the motor speed, and determine whether the engine speed is synchronized with the motor speed at step S55. When the engine speed is synchronized with the motor speed at step S55, the controller 70 may be configured to engage the engine clutch 20.

When the input speed of the transmission 50 is less than the minimum engine speed at step S51, the controller 70 may be configured to generate slip of the dual clutch 40 by reducing the coupling force of the dual clutch 40. The controller 70 may be configured to operate the engine 10 to be maintained in the idle state after starting the engine 10 at step S71. The controller 70 is then configured to determine whether the engine speed is synchronized with the motor speed at step S73. When the engine speed is synchronized with the motor speed, the controller 70 may be configured to increase the vehicle speed by engaging the engine clutch 20 at step S75. The controller 70 may be configured to compare the input speed of the transmission 50 with the minimum engine speed at step S77, and the engine torque may be transmitted to the drive shaft 60 by fully engaging the dual clutch 40 to prevent generation of slip when the input speed of the transmission 50 is greater than the minimum engine speed at step S79.

The technical feature of the mode control apparatus and the control method according to an exemplary embodiment of the present invention is that mode conversion is performed using slip of the dual clutch 40 rather than the engine clutch 20. Therefore, the engine clutch 20 can be designed as a dry clutch. Accordingly, the manufacturing cost and the fuel consumption of the vehicle may be reduced. Further, since the engine clutch 20 may be designed as dry clutch, a degree of design freedom may be improved.

DESCRIPTION OF SYMBOLS

10: engine
12: HSG
20: engine clutch
30: motor
40: dual clutch
50: transmission
60: drive shaft
70: controller While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A mode control apparatus of a hybrid vehicle, comprising:
   a first clutch disposed between an engine and a motor generating power;
   a second clutch disposed between the motor and a transmission; and
   a controller configured to execute engagement and disengagement of the first clutch and the second clutch, wherein the controller is configured to adjust a speed of the motor and the engine to be synchronized by generating slip in the second clutch when a transition from an electric vehicle (EV) mode to a hybrid electric vehicle (HEV) mode is requested, wherein the EV mode is a mode that disengages the first clutch and engages the second clutch, and drives the vehicle using the motor driving torque, wherein the HEV mode is a mode that engages the first clutch and the second clutch, and drives the vehicle using the motor driving torque and the engine driving torque, wherein the controller is configured to start the engine, operate the second clutch to slip by reducing coupling force of the second clutch, operate the first clutch to be engaged after synchronizing an engine speed and a motor speed, and operate the second clutch to be fully engaged when the input speed of the transmission is greater than a minimum engine speed, when the transition from the EV mode to the HEV mode is requested in a state where an input speed of the transmission is less than a minimum speed of the engine, and wherein the engagement of the first clutch is prohibited before the engine speed is synchronized with the motor speed.

2. The mode control apparatus of the hybrid vehicle of claim 1, wherein the controller is configured to operate the second clutch to be released, operate the first clutch to be engaged by starting the engine, operate the second clutch to slip by increasing coupling force of the second clutch, and operate the second clutch to be fully engaged when input speed of the transmission is greater than a minimum engine speed, when the transition from the EV mode to the HEV mode is requested and when the motor cannot be used.

3. The mode control apparatus of the hybrid vehicle of claim 1, wherein the controller is configured to start the engine while maintaining engagement of the second clutch, and operate the first clutch to be engaged after synchronizing the engine speed and the motor speed, when the transition from the EV mode to the HEV mode is requested and when an input speed of the transmission is greater than a minimum speed of the engine.

4. A mode control method of a hybrid vehicle, comprising:

determining, by a controller, whether a transition from an electric vehicle (EV) mode to a hybrid electric vehicle (HEV) mode is requested;

determining, by the controller, whether an input speed of a transmission is zero;

determining, by the controller, whether the input speed of the transmission is greater than a minimum engine speed, when the input speed of the transmission is greater than zero;

generating, by the controller, slip of a second clutch disposed between a motor and a transmission by reducing a coupling force of the second clutch and maintaining an engine in an idle state after starting the engine, when an input speed of the transmission is less than the minimum engine speed;

determining, by the controller, whether the engine speed is synchronized with the motor speed;

engaging, by the controller, a first clutch disposed between the engine and the motor when the engine speed and the motor speed are synchronized; and fully engaging, by the controller, the second clutch when the input speed of the transmission is greater than the minimum engine speed, wherein the engagement of the first clutch is prohibited before the engine speed is synchronized with the motor speed.

5. The mode control method of the hybrid vehicle of claim 4, further comprising:

operating, by the controller, the second clutch to be released by reducing coupling force of the second clutch, operating the first clutch to be engaged, starting the engine using the motor or an additional starting motor, and operating the second clutch to cause slip by increasing coupling force of the second clutch, when the input speed of the transmission is zero;

determining, by the controller, whether the input speed of the transmission is greater than the minimum engine speed; and fully engaging, by the controller, the second clutch when the input speed of the transmission is greater than the minimum engine speed.

6. The mode control method of the hybrid vehicle of claim 4, further comprising:

synchronizing, by the controller, the engine speed with the motor speed after starting the engine while maintaining engagement of the second clutch; and engaging, by the controller, the first clutch after synchronizing the engine speed and the motor speed when the input speed of the transmission is greater than zero and the input speed of the transmission is greater than the minimum engine speed.

7. A non-transitory computer readable medium containing program instructions executed by a controller, the computer readable medium comprising:

program instructions that determine whether a transition from an electric vehicle (EV) mode to a hybrid electric vehicle (HEV) mode is requested;

program instructions that determine whether an input speed of a transmission is zero;

program instructions that determine whether the input speed of the transmission is greater than a minimum engine speed, when the input speed of the transmission is greater than zero;

program instructions that generate slip of a second clutch disposed between a motor and a transmission by reducing a coupling force of the second clutch and maintaining an engine in an idle state after starting the engine, when an input speed of the transmission is less than the minimum engine speed;

program instructions that determine whether the engine speed is synchronized with the motor speed;

program instructions that engage a first clutch disposed between the engine and the motor when the engine speed and the motor speed are synchronized; and program instructions that fully engage the second clutch when the input speed of the transmission is greater than the minimum engine speed, wherein the engagement of the first clutch is prohibited before the engine speed is synchronized with the motor speed.

8. The non-transitory computer readable medium of claim 7, further comprising:

program instructions that operate the second clutch to be released by reducing coupling force of the second clutch, operate the first clutch to be engaged, start the engine using the motor or an additional starting motor, and operate the second clutch to cause slip by increasing coupling force of the second clutch, when the input speed of the transmission is zero;
program instructions that determine whether the input speed of the transmission is greater than the minimum engine speed; and
program instructions that fully engage the second clutch when the input speed of the transmission is greater than the minimum engine speed.

9. The non-transitory computer readable medium of claim 7, further comprising:
program instructions that synchronize the engine speed with the motor speed after starting the engine while maintaining engagement of the second clutch; and
program instructions that engage the first clutch after synchronizing the engine speed and the motor speed when the input speed of the transmission is greater than zero and the input speed of the transmission is greater than the minimum engine speed.

* * * * *